United States Patent
Kang et al.

(10) Patent No.: US 8,202,086 B2
(45) Date of Patent: Jun. 19, 2012

(54) VERTICAL FURNACE FOR FABRICATION OF FINE ARTIFICIAL LIGHTWEIGHT AGGREGATES

(75) Inventors: Seung gu Kang, Yongin-si (KR); Yoo Taek Kim, Kyeonggi-do (KR); Ki Gang Lee, Kyeonggi-do (KR); Jung Hwan Kim, Kyeonggi-do (KR); Hyun Ju Lee, Kyeonggi-do (KR)

(73) Assignee: Kyonggi University Industry & Academia Cooperation Foundation, Suwon, Kyeonggi-do (KR)

( * ) Notice: Subject to any disclaimer, the term of this patent is extended or adjusted under 35 U.S.C. 154(b) by 860 days.

(21) Appl. No.: 12/304,240

(22) PCT Filed: Dec. 29, 2006

(86) PCT No.: PCT/KR2006/005870
§ 371 (c)(1),
(2), (4) Date: Dec. 10, 2008

(87) PCT Pub. No.: WO2007/078119
PCT Pub. Date: Jul. 12, 2007

(65) Prior Publication Data
US 2009/0325115 A1 Dec. 31, 2009

(30) Foreign Application Priority Data
Dec. 30, 2005 (KR) .................. 10-2005-0135092

(51) Int. Cl.
*F27B 3/10* (2006.01)
(52) U.S. Cl. .............. 432/95; 432/69; 432/214
(58) Field of Classification Search .......... 432/95, 432/96, 99, 67, 69, 71, 214, 215
See application file for complete search history.

(56) References Cited

U.S. PATENT DOCUMENTS
3,159,386 A * 12/1964 Reaney et al. ............ 432/133
(Continued)

FOREIGN PATENT DOCUMENTS
JP 08261657 A 10/1996
(Continued)

OTHER PUBLICATIONS
International Search Report for PCT/KR2006/005870, dated May 2, 2007.

*Primary Examiner* — Gregory A Wilson
(74) *Attorney, Agent, or Firm* — Locke Lord LLP

(57) ABSTRACT

The present invention relates to a vertical furnace for fabricating an artificially lightweight fine-aggregates in that the aggregates can be fired in the vertical furnace in a floating state, so that the contacting time between the aggregates can be minimized, thereby preventing the adhesion between the aggregates and manufacturing the artificially lightweight fine-aggregates as an insulating concrete for building material, sound-absorbing materials, and lagging material. The vertical furnace for fabricating artificially lightweight fine-aggregates comprises a vertical furnace having a raw material inlet; a ventilation fan for supplying a compressed air to the vertical furnace; an air regulating valve for regulating the supply of a main air supplied to the vertical furnace; an exhaust fan for discharging the artificially lightweight fine-aggregates of the vertical furnace to outside by discharging the main air supplied from the air regulating valve to outside of the vertical furnace; a heat exchanger for cooling the artificially lightweight fine-aggregates discharged from the vertical furnace; and a collecting device for collecting the artificially lightweight fine-aggregates cooled by the heat exchanger.

7 Claims, 1 Drawing Sheet

U.S. PATENT DOCUMENTS

| | | | |
|---|---|---|---|
| 3,704,525 A * | 12/1972 | Devel | 34/164 |
| 4,040,852 A | 8/1977 | Jones | |
| 4,094,629 A | 6/1978 | Greenawalt | |
| 4,442,795 A * | 4/1984 | Strohmeyer, Jr. | 122/4 D |
| 6,381,962 B1 * | 5/2002 | Ohshita et al. | 60/645 |
| 2006/0057532 A1 * | 3/2006 | Norrman | 432/95 |
| 2011/0173836 A1 * | 7/2011 | Orr et al. | 34/417 |
| 2012/0023823 A1 * | 2/2012 | D'Agostini | 48/197 R |

FOREIGN PATENT DOCUMENTS

| | | |
|---|---|---|
| JP | 2001158657 A | 6/2001 |
| KR | 1019980001915 A | 3/1998 |

* cited by examiner

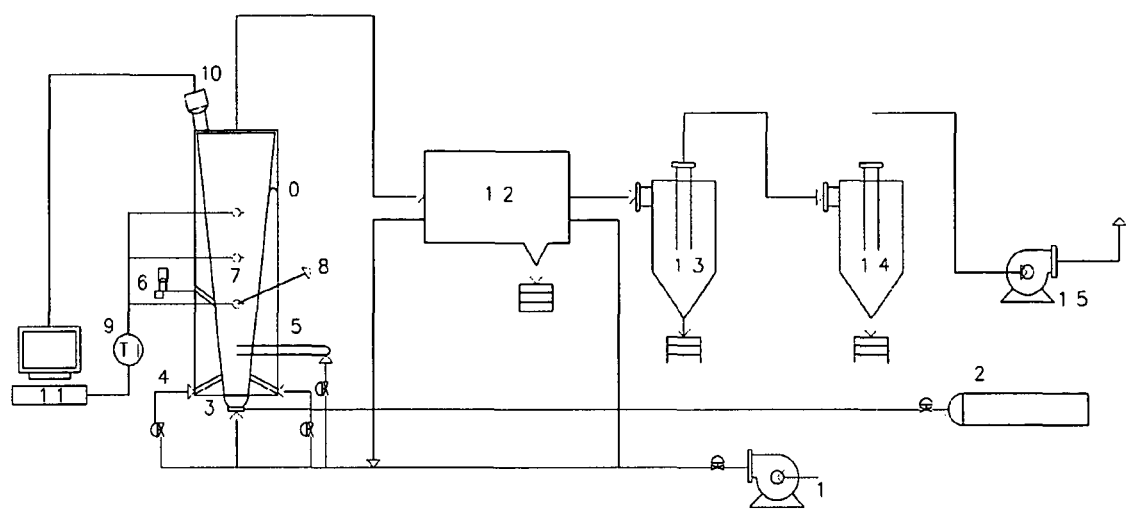

VERTICAL FURNACE FOR FABRICATION OF FINE ARTIFICIAL LIGHTWEIGHT AGGREGATES

FIELD OF THE INVENTION

The present invention relates to a vertical furnace for fabricating an artificially lightweight fine-aggregates, and more particularly, to a vertical furnace for fabricating an artificially lightweight fine-aggregates in that the aggregates can be fired in the vertical furnace in a floating state, so that the contacting time between the aggregates can be minimized, thereby preventing the adhesion between the aggregates and manufacturing the artificially lightweight fine-aggregates as an insulating concrete for building material, sound-absorbing materials, and lagging material.

BACKGROUND OF THE INVENTION

Generally, lightweight aggregates are widely used in a concrete for increasing weight of a high-building, a bridge and so on, insulating and waterproof materials for building roof and layer, a concrete for dampproof, a soundproofing portioning, building materials for preventing vibration, materials for controlling moisture of a golf green, gardening materials of a flowerpot and a plant for controlling moisture evaporation, ceramic filters, and ceramic carrier.

Up to the present, natural aggregates as the lightweight aggregates collected from a river, mountain and sea and so on are mostly used. However, it is urgent for us to supply the artificially lightweight aggregates on account of the exhaustion of the natural aggregates.

In the meantime, during the fabrication of the concrete, since the aggregates are suitably filled in order to obtain a superior strength, it is important to produce the aggregates below 2 mm in grain size. In conventional artificially lightweight aggregates, a forming body of 5-12 mm is injected in the type of a horizontal firing and then, it is fired and discharged.

However, it has difficulty in manufacturing artificially lightweight aggregates or artificially lightweight sands below 4 mm in size owing to the adhesion phenomenon between the aggregates during the firing process of high temperature. That is, the artificially lightweight aggregates or artificially lightweight sands below 4 mm in size pass through a sintering process of 1150-1200° C. among the fabrication processes. At this time, in case of containing solvent ingredients of a product in abundance, since fluids are formed at the surface thereof, the adhesion phenomenon between the aggregates is generated, so that it has difficulty in manufacturing the artificially lightweight aggregates or the artificially lightweight sands below 4 mm in the general furnace or a rotary kiln.

DISCLOSURE OF INVENTION

Accordingly, the present invention has been made to solve the above-mentioned problems occurring in the prior art, and an object of the present invention is to provide a vertical furnace for fabricating an artificially lightweight fine-aggregates in that aggregates are floated in the furnace, whereby evading an adhesion phenomenon between the aggregates generated during manufacturing it in a general electric furnace or a rotary kiln and simplifying the operation thereof.

Another object of the present invention is to provide a vertical furnace for fabricating an artificially lightweight fine-aggregates in that the lightweight aggregates are floated and fired in the vertical furnace, whereby improving the conventional adhesion problem.

Further another object of the present invention is to provide a vertical furnace for fabricating an artificially lightweight fine-aggregates in that an artificially lightweight fine-aggregates having a small grain size can be produce, whereby preventing the exhaustion of the natural sand existed in the river or the mountain, and the grain size of the aggregates can be widen, whereby implementing a superior strength thereof during manufacturing of the concrete.

To achieve the above object of the present invention, there is provided a vertical furnace for fabricating artificially lightweight fine-aggregates comprising a vertical furnace having a raw material inlet; a ventilation fan for supplying a compressed air to the vertical furnace; an air regulating valve for regulating the supply of a main air supplied to the vertical furnace; an exhaust fan for discharging the artificially lightweight fine-aggregates of the vertical furnace to outside by discharging the main air supplied from the air regulating valve to outside of the vertical furnace; a heat exchanger for cooling the artificially lightweight fine-aggregates discharged from the vertical furnace; and a collecting device for collecting the artificially lightweight fine-aggregates cooled by the heat exchanger.

As described above, according to the vertical furnace for fabricating artificially lightweight fine-aggregates, the artificially lightweight sands below 4 mm in size can be manufactured without adhering between aggregates.

Also, the size of artificially lightweight fine-aggregates can be easily controlled by means of the control of the operation condition.

Moreover, the side wall of the vertical furnace has a predetermined slope, so that the floating distribution of the lightweight aggregates forming body can be decreased so as to float the forming body in the flame in case of the aggregates having a comparatively long processing time. Accordingly, it can be sufficiently fired under a high temperature time, whereby increasing the fired efficiency thereof.

Furthermore, the slope of the wall surface of the furnace becomes larger and the auxiliary fan system located at the verge of the flame is utilized, so that it can prevent the contamination of the inside of the vertical furnace caused by the attachment of the aggregates on the wall surface of the furnace.

Also, the aggregates floated and fired in the vertical furnace and the air supplied from the lower portion thereof are exhausted to outside through the forcibly exhaust fan to be collected by the collecting apparatus divided into three devices, whereby the collecting apparatus can be classified according to the weight of the aggregates.

BRIEF DESCRIPTION OF THE DRAWINGS

The above as well as the other objects, features and advantages of the present invention will be more apparent from the following detailed description taken in conjunction with the accompanying drawings, in which:

FIG. 1 illustrates a vertical furnace for fabricating an artificially lightweight fine-aggregates according to the present invention.

A preferred embodiment of the invention will be described in detail below with reference to the accompanying drawings.

FIG. 1 illustrates a vertical furnace for fabricating an artificially lightweight fine-aggregates according to the present invention.

As shown in FIG. 1, the vertical furnace for fabricating the artificially lightweight fine-aggregates according to the present invention includes the vertical furnace 7 having a raw material inlet 6, a ventilation fan 1 for supplying a compressed air to the vertical furnace 7, an air regulating valve 5 for regulating the supply of a main air supplied to the vertical furnace 7, a sub air regulating valve 4 for supplying a sub air to the verge of a flame of the vertical furnace 7 so as to regulate a floating zone of the aggregates in the vertical furnace 7, an exhaust fan 15 for discharging the artificially lightweight fine-aggregates of the vertical furnace 7 to outside by discharging the main air supplied from the air regulating valve 5 to outside of the vertical furnace 7, a heat exchanger 12 for cooling the artificially lightweight fine-aggregates discharged from the vertical furnace 7, a collecting device for collecting the artificially lightweight fine-aggregates cooled by the heat exchanger 12, a plurality of windows 8 vertically arranged on the vertical furnace 7 at a predetermined interval so as to check out a state of the aggregates in the vertical furnace 7, a camera 10 for photographing the inside of the vertical furnace 7 attached to a upper portion of the vertical furnace 7, an output device 11 for displaying the photograph from the camera 10 on a screen, and a thermocouple 9 vertically arranged on a side wall of the vertical furnace 7 at a predetermined interval so as to detect the interior temperature of the vertical furnace 7.

The side wall of the vertical furnace 7 has a slope of 3-10 degrees.

The output device 11 includes a monitor and a PC and so on.

The collecting device divides into first and second collecting devices 13 and 14 according to the weight of the aggregates. Here, the weight of the aggregates collected by the first collecting device 13 is larger than that of the aggregates collected by the second collecting device 14.

A reaction of the vertical furnace for fabricating the artificially lightweight fine-aggregates having the above structures will be described in below.

Firstly, the compressed air and the compressed fuel are supplied to a burner 3 formed at the lower portion of the vertical furnace 7 through the ventilation fan 1 and a compressed fuel supply portion 2 respectively, so that the burner 3 spouts out the flame of high temperature and pressure into the vertical furnace 7.

Continuously, the lightweight aggregates forming body grinded by 1-4 mm according to the usage thereof is injected into a center of the flame of the vertical floating furnace 7 through the raw material inlet 6, so that it is fired in the flame in a floating state.

At this time, the main air supplied from the ventilation fan 1 and the sub air injected into the verge of the flame of the vertical furnace 7 are regulated by means of the main air regulating valve 5 and the sub air regulating valve 4, so that it can regulate the floating zone of the aggregates. Also, the amount of the fuel from supplied from the compressed fuel supply portion 2 is controlled, so that the interior temperature of the vertical furnace 7 can be controlled.

Also, the shape of the aggregates floated and fired in the vertical furnace 7 is checked out through top, middle, and bottom windows 8 formed on the vertical furnace 7. At the same time, the state of the aggregates can be confirmed in the monitor 11 through the camera 10 attached to the upper portion of the vertical furnace 7

Moreover, the interior temperature of the vertical furnace 7 can be detected through the thermocouple 9 located at top, middle, and bottom portions of the vertical furnace 7.

In the meantime, the artificially lightweight fine-aggregates fired through the firing process is discharged to the outside of the vertical furnace 7 by means of the main air supplied from the air regulating valve 5 located at the lower portion thereof and the forcibly exhaust fan 16. The discharged artificially lightweight fine-aggregates is cooled in the heat exchanger 12 and then, collected by the first and second collecting devices 13 and 14.

Here, according to the weight of the aggregates, the comparatively weight aggregates can be collected by the first collecting device 13 and the comparatively light aggregates can be collected by the second collecting device 14. Accordingly, the collecting device can divide into first and second collecting devices 13 and 14 according to the weight of the aggregates.

Especially, the side wall of the vertical furnace 7 has a predetermined slope θ. That is, the side wall of the vertical furnace 7 has a slope of 3-10 degrees, so that the pressure of the upper portion of the vertical furnace 7 is lower than that of the middle or lower portion thereof. Accordingly, since the floating distribution of the lightweight aggregates forming body can be decreased, the aggregates can be stayed into the flame for a long time, so that it can be sufficiently fired under a high temperature in case of the aggregates having a comparatively long processing time, thereby increasing the fired efficiency. That is, in case of the aggregates having a long treating time up to the firing or various sizes and weights, the lightweight aggregates forming body is stayed in the hot zone for a long time to be sufficiently fired, so that the firing can be efficiently performed. If the slope of the wall surface thereof becomes larger, since the aggregates go down, the inside of the vertical furnace 7 can be contaminated. At this time, the sub air is injected in the periphery of the flame, so that the friction power is generated on the wall of the vertical furnace 7, thereby it can prevent the decreasing of the pressure and the contamination of the vertical furnace 7.

The present invention relates to a vertical furnace for fabricating an artificially lightweight fine-aggregates in that the aggregates can be fired in the vertical furnace in a floating state, so that the contacting time between the aggregates can be minimized, thereby preventing the adhesion between the aggregates and manufacturing the artificially lightweight fine-aggregates as an insulating concrete for building material, sound-absorbing materials, and lagging material.

While this invention has been described in connection with what are presently considered to be the most practical and preferred embodiments, it is to be understood that the invention is not limited to the disclosed embodiments and the drawings, but, on the contrary, it is intended to cover various modifications and variations within the spirit and scope of the appended claims.

The invention claimed is:

1. A vertical furnace for fabricating artificially lightweight fine-aggregates comprising:

a vertical furnace having a raw material inlet;

a ventilation fan for supplying a compressed air to the vertical furnace;

an air regulating valve for regulating a supply of a main air supplied to the vertical furnace;

an exhaust fan for discharging the artificially lightweight fine-aggregates of the vertical furnace to outside by discharging the main air supplied from the air regulating valve to outside of the vertical furnace;

a heat exchanger for cooling the artificially lightweight fine-aggregates discharged from the vertical furnace; and a collecting device for collecting the artificially lightweight fine-aggregates cooled by the heat exchanger.

2. A vertical furnace for fabricating artificially lightweight fine-aggregates as claimed in claim 1, wherein a side wall of the vertical furnace 7 has a slope of 3-10 degrees.

3. A vertical furnace for fabricating artificially lightweight fine-aggregates as claimed in claim 1 further comprising a sub air regulating valve for supplying a sub air to a verge of a flame of the vertical furnace so as to regulate a floating zone of the aggregates in the vertical furnace.

4. A vertical furnace for fabricating artificially lightweight fine-aggregates as claimed in claim 1 further comprising a plurality of windows vertically arranged on the vertical furnace at a predetermined interval so as to check out a state of the aggregates in the vertical furnace.

5. A vertical furnace for fabricating artificially lightweight fine-aggregates as claimed in claim 1 further comprising a camera for photographing an inside of the vertical furnace attached to an upper portion of the vertical furnace and an output device for displaying the photograph from the camera on a screen.

6. A vertical furnace for fabricating artificially lightweight fine-aggregates as claimed in claim 1 further comprising a thermocouple vertically arranged on a side wall of the vertical furnace at a predetermined interval so as to detect an interior temperature of the vertical furnace.

7. A vertical furnace for fabricating artificially lightweight fine-aggregates as claimed in claim 1, wherein the collecting device divides into first and second collecting devices and according to a weight of the aggregates, the weight of the aggregates collected by the first collecting device being larger than that of the aggregates collected by the second collecting device.

* * * * *